United States Patent
Korzunov

(10) Patent No.: US 11,537,377 B2
(45) Date of Patent: Dec. 27, 2022

(54) METHOD AND SYSTEM FOR PROFILE BASED DEPLOYMENTS

(71) Applicants: Atlassian Pty Ltd., Sydney (AU); Atlassian Inc., San Francisco, CA (US)

(72) Inventor: Anton Korzunov, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/133,514

(22) Filed: Dec. 23, 2020

(65) Prior Publication Data

US 2021/0191701 A1    Jun. 24, 2021

(30) Foreign Application Priority Data

Dec. 24, 2019  (AU) .............................. 2019904925

(51) Int. Cl.
*G06F 11/34* (2006.01)
*G06F 11/36* (2006.01)
*G06F 8/60* (2018.01)
*G06F 11/30* (2006.01)

(52) U.S. Cl.
CPC ............ *G06F 8/60* (2013.01); *G06F 11/3051* (2013.01); *G06F 11/3438* (2013.01)

(58) Field of Classification Search
CPC .......... H04W 4/50; H04W 4/60; H04L 43/02; H04L 43/04; H04L 41/0663; H04L 41/5019; H04L 12/1403; H04L 12/1432; H04L 12/1442; H04L 67/10; H04L 67/34; H04L 69/329; H04L 29/06; G06F 8/60; G06F 8/65; G06F 8/71; G06F 11/0709; G06F 11/3409; G06F 8/62; G06F 11/3051; G06F 11/3438

See application file for complete search history.

(56) References Cited

U.S. PATENT DOCUMENTS

| | | | | |
|---|---|---|---|---|
| 10,474,453 | B2* | 11/2019 | Mehrotra | G06F 8/20 |
| 10,740,208 | B2* | 8/2020 | Bryant | G06F 8/60 |
| 2017/0031706 | A1* | 2/2017 | Podvratnik | G06F 9/5027 |
| 2017/0318083 | A1* | 11/2017 | Ignatyev | H04L 67/1023 |

OTHER PUBLICATIONS

Liu et al., Understanding Diverse Usage Patterns from Large-Scale Appstore-Service Profiles, 28 pages (Year: 2018).*

* cited by examiner

*Primary Examiner* — Thuy Dao
(74) *Attorney, Agent, or Firm* — Brownstein Hyatt Farber Schreck, LLP

(57) ABSTRACT

Disclosed are techniques for deploying an application. An application system may host one or more software applications, each software application having a plurality of application deployments. A first application deployment is customized based on a first set of user interactions with the application and a second application deployment is different to the first deployment due to being customized based on a second set of user interactions with the application. The second set of user interactions is different to the first set of user interactions. Usage information about a user is received, the usage information indicating a third set of user interactions with an application of the one or more software applications. A user profile of the user is determined from the usage information. The first application deployment is determined based on the user profile. The first application is deployed for the user based on the first application deployment.

21 Claims, 3 Drawing Sheets

METHOD AND SYSTEM FOR PROFILE BASED DEPLOYMENTS

CROSS-REFERENCE TO RELATED APPLICATION(S)

This application claims the benefit of Australian patent application no. AU2019904925, filed Dec. 24, 2019 and titled "A Method and System for Profile Based Deployments," the disclosure of which is hereby incorporated herein by reference in its entirety.

FIELD

The present disclosure is directed to deploying software applications. Specifically, the present disclosure is directed to profile based deployments of software applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Many software applications available today provide a set of standard features to all users. Some variations in features may be provided—e.g., some application developers may offer different deployments of a software application to users.

All users may not use all the features offered by the software application. Some users may frequently use only a few of the features of the application. Despite this, software applications are often deployed as a single monolithic deployment. This can result in large deployments that unnecessarily utilize a significant amount of disk space or other computing resources. To address this, some applications providers may provide lean builds of their software applications (such as a "beginner" build with a limited set of features, in contrast to an "expert" build with all available features). However, these lean builds are limited. If a user does not fit easily into the predefined category (such as wanting to use features that are not present in the lean build) then the user will either have to use the full application or have be able to limit their usage to the available features.

SUMMARY

A computer implemented method for deploying an application is disclosed. The method includes at an application system hosting one or more software applications. Each software application has a plurality of application deployments, wherein a first application deployment is based on a first set of user interactions with the application and a second application deployment is different to the first deployment due to being based on a second set of user interactions with the application. The method also includes receiving usage information about a user, the usage information indicating a third set of user interactions with an application of the one or more software applications, determining a user profile of the user from the usage information, determining the first application deployment based on the user profile; and deploying the first application for the user based on the first application deployment.

Another disclosed computer implemented method for deploying an application includes determining, by a processing system, a first application profile based on usage of a software application and determining, by the processing system, a second application profile based on usage of the software application that is different to the first application profile. The method also includes determining a first application deployment of the software application for the processing system based on the first application profile and determining a second application deployment of the software application for the processing system based on the second application profile. The method further includes receiving, at the processing system, user usage information for a user, the user usage information comprising information indicating usage of the software application, determining, by the processing system based on the user usage information, the first application deployment and not the second application deployment and based on the determination of the first application deployment, deploying by the processing system, the first application deployment of the software application for the user.

Also disclosed is non-transient computer-readable storage, storing instructions that when executed by a processor, cause the processor to: determine a first application profile for a software application; determine a second application profile for the software application that is different to the first application profile; determine a first application deployment of the software application for the first application profile; determine a second application deployment of the software application for the second application profile; receive user usage information for a user, the user usage information comprising information indicative of usage of the first software application; determine the first application profile for the user based on the user usage information; determine the first application deployment for the user based on the determined first application profile; and deploy the first application deployment for the user.

Also disclosed are computer processing systems for implementing the disclosed methods and including the disclosed non-transient computer-readable storage.

DETAILED DESCRIPTION

Figure 1:
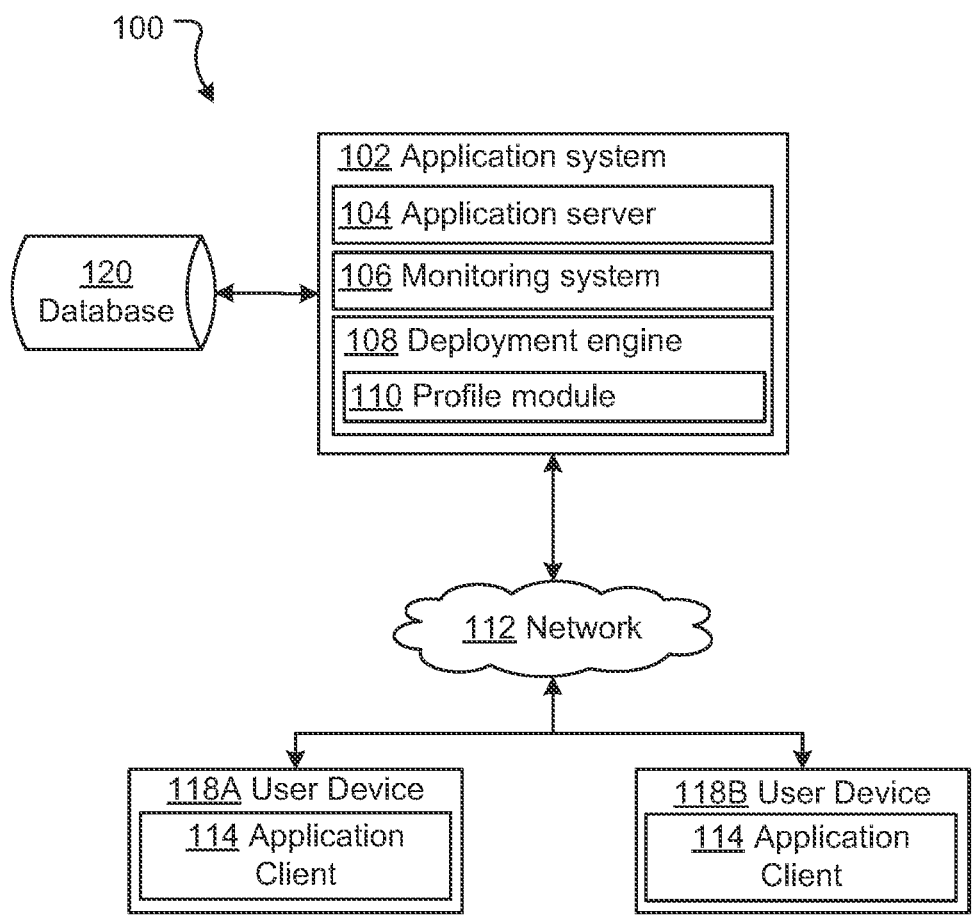
FIG. 1 illustrates an example environment that includes a system for profile based deployments.

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring. It will be understood that the invention disclosed and defined in this specification extends to all alternative combinations of two or more of the individual features mentioned or evident from the text or drawings. All of these different combinations constitute various alternative aspects of the invention.

In many software applications, some features might not be used by some users. However, there may be other users who use the same feature very often. Therefore standard deployments may be cumbersome in terms of computing resources.

Embodiments of the present disclosure address one or more of these issues. In particular, some embodiments of the present disclosure automatically profile software applications for users. Some embodiments of the present disclosure automatically deploy software applications for users based on a profile.

For profiling purposes, a deployment engine may be configured to collect application usage data from multiple users of a software application. After sufficient application usage data is collected, the deployment engine forms application profiles based on the usage data. Each application profile has usage patterns or use cases that are similar in one or more measurable dimensions. In some embodiments, a deployment engine is configured to automatically form profiles, in combination with automatic deployment of software applications for users based on the automatically formed profiles. The automatically formed profiles may be used together with one or more manually defined profiles.

The deployment engine may determine one or more components of the software application for forming part of an application deployment associated with each profile. Alternatively, the deployment engine may receive input matching each of a plurality of application deployments with a plurality of profiles.

Optimization advantages may be achieved using application profiles for application deployment. For example, deployments associated with a profile may also be associated with a measure of resource utilization. The resource utilization may be an expected utilization, for example developed by the deployment engine as part of the collection of application usage data, or a constrained utilization, for example due to a limitation placed on the resources that an application deployment can utilize. In some systems, such as multitenant systems, it may be beneficial to use this measure of resource utilization for system management. For example the measure of an expected or constrained utilization of resources by an application deployment can be used as an input to a load balancing process. An example of a measure of resource utilization is how often an instance is used. Another example measure is an indication of load on a resource, for instance CPU/GPU load, or bandwidth. In some embodiments the deployment engine may use the measure(s) of resource utilization to determine and output one or more predictions of the average load.

In some embodiments, the deployment engine is configured to assign/match a user to a particular application profile based on the user's individual usage data. That is, the deployment engine receives user usage data or characteristics of user usage are analyzed to produce user usage data, and a determination made by the deployment engine as to which application profile matches the user usage data. The user usage data typically has similar usage patterns to at least one application profile. If not, the deployment engine can use a default application profile.

In certain embodiments, the deployment engine is configured to re-determine the application profiles or the user profiles. That is, application profiles can be recalculated based on different dimensions or a different metric for measuring similarity in usage data. User profiles can also be recalculated based on the same dimensions and metric, but with additional or different user usage data. Such recalculations can occur on an ad-hoc or periodic basis, and can be used to determine whether the application profiles or user profiles are still relevant.

In such embodiments, an individual user may also be re-assigned to a different application profile that matches the user based on the user's individual usage data. That is, user usage data may change over time and therefore on recalculation it is possible that the user may be allocated to a different application profile from the one they were allocated to previously.

It will be appreciated that the disclosed deployment engine may be configured to perform two or more of these functions together. For example, a deployment engine may be configured to determine application profiles at a first time and then determine which application profile to associate with a user profile of a new user as new users are added. Further, the functions of the deployment engine can be performed at different intervals. For example, application profiles may be re-determined at a first frequency, whereas individual users may be re-assigned to application profiles at the same frequency or a different frequency.

Example System

FIG. 1 illustrates an example environment in which embodiments and features of the present disclosure are implemented. Specifically, FIG. 1 illustrates a processing system 100 involved in deployment of software applications. Example the processing system 100 includes a communications network 116, which interconnects user devices 118A, 118B, and an application system 102. The application system 102 typically has access to a database 120. Each user device 118A, 118B is a computer processing system with an application client 114 installed thereon.

In general, an application system 102 is a system entity that hosts one or more software applications and/or content. The application system 102 may include an application server 104 for hosting a software application and may be coupled to one or more storage devices (e.g., database 120) for storing application specific data. Examples of software applications hosted by the application system 102 may include interactive chat applications (e.g., Slack™), collaborative applications (e.g., Confluence™), software code management system (e.g., Bitbucket™), and issue tracking applications (e.g., Jira™). Jira, Confluence, and BitBucket are all offered by Atlassian, Inc at the date of filing of the present application.

In order to run a particular software application, the application server 104 includes one or more application programs, libraries, APIs or other software elements that implement the features and functions of the application. In one example the application server 104 includes a monitoring system 106 which monitors usage of the application hosted by the application system and a deployment engine 108 which is configured to automatically customize a deployment of the software application hosted by the application server 104 as described in detail below.

The application system 102 also stores application data. Application data generally includes: data measuring the operation of the hosted application (for example, CPU usage, memory usage, network usage, latency, and the like); and application data (i.e., the content hosted/maintained by the application, which can be, for example, issue data (in Jira), page/document data (in Confluence), conversation and chatroom history (in HipChat and Slack), etc.). The data is stored on and managed by database 120. Database 120 is provided by a database server which may be hosted by server 104, but is more typically hosted on a separate physical computer in communication (directly or indirectly via one or more networks) with the server 104.

The application server 104 may be a web server (for interacting with web browser clients) or an application server (for interacting with dedicated application clients). While a single server architecture has been described herein, it will be appreciated that the application system 102 can be implemented using alternative architectures. For example, in certain cases a clustered architecture may be used, where multiple server computing instances (or nodes) are instantiated to meet system demand Conversely, in the case of small enterprises with relatively simple requirements, an application system 102 may be a stand-alone implementation (i.e. a single computer directly accessed/used by the end user).

User devices 118 may be any device suitable for performing client-side operations described herein, for example a mobile device (e.g. a tablet or mobile phone), a portable device (such as laptop computer), or any other computing device (e.g. a desktop computer).

The users of user devices 118 may interact with the application system 102 through one or more user accounts. This interaction may include any type of user account interaction with the application system 102, including interaction with content and/or software application(s) hosted by the application system 102. Example interactions include accessing/viewing and/or contributing to one or more documents hosted by the application system 102, writing posts, commenting on content, visiting web pages, sharing, liking, or viewing content, communicating with user accounts in real-time chat interfaces, etc.

In order to allow users to perform these functions, as illustrated in FIG. 1, each user device 118 includes one or more client (software) applications (e.g., application clients 114A and 114B) that are configured to access software applications made available by application system 102.

The application clients 114 are deployments of the software application and include instructions and data stored in the memory (e.g. non-transient compute readable media) of the user devices 108 on which the applications are installed/run. These instructions are executed by a processor of the user device 118 to perform various functions as described herein. By way of example, functions performed by the application clients 114 may include communicating with software applications hosted by the application system 102, rendering user interfaces based on instructions received from the applications, receiving inputs from user to interact with content hosted by application system 102.

The application clients 114 may be implemented in various ways. For example, the client application may be a web browser application (such as, for example, Chrome, Safari, Internet Explorer, Opera) which accesses the software applications hosted by the application system 102 via appropriate uniform resource locators (URL) and communicates with the application system via general world-wide-web protocols (e.g. HTTP, HTTPS, FTP). In this case, the web browser application is configured to request, render and display user interfaces that conform to a markup language such as HTML, XML or extensions, and may be capable of internally executing browser-executable code such as JAVASCRIPT, or other forms of code. Alternatively, the client 114 may be a specific application programmed to communicate with the application system 102 using defined application programming interface (API) calls.

For completeness it is noted that application or user operations may be performed by the application client 114, the application server 104 or by a combination of the application client 114 and the application server 104. For example, application operations involving the display of user interfaces may be performed by the application client 114. The data displayed, however, may be generated by the application client 114 itself, or generated by the application server 104 communicated to the client 114. Similarly, application operations involving user input involve the user device 118A receiving user input (e.g. at input device 154) and passing that input to the application client 114. The information input may be processed by the application client 114 itself, or communicated by the application client 114 to the application system 102 to be processed by the application server 104. Application operations involving writing data to the data store 120 involve the application server 104. The data written to the data store 120 may, however, be communicated to the application server 104 by the application client 114.

As described previously, the application system 102 includes a monitoring system 106. The monitoring system 106 includes logic and code required for monitoring application usage data. For example, the monitoring system 106 may be configured to track user interactions with the software application via the application client 114. In one embodiment, each time a user interacts with the software application one or more system "events" may be generated. In some embodiments, the monitoring system 106 may track user interactions by tracking system events generated in response to user interaction with the software application.

The deployment engine 108 is configured to perform one or more functions such as determining application profiles, assigning users to the application profiles, recalculating application profiles and identifying one or more features or use cases to customize a deployment of the software application for each application profile. In addition, the deployment engine 108 may also be configured to determine user profiles based on the usage information of the software application. In alternative embodiments, however, operations such as these (and others) can instead be performed by the application client 114.

To perform these functions, the deployment engine 108 includes profile module 110. In some embodiments the profile module 110 includes the logic and code for determining the application profiles, determining user profiles and allocating a user profile to an application profile. As a result, the deployment engine 108 may customize a deployment of the software application by including one or more components of the software application associated with a particular application profile, enabling or disabling features in a deployment based on a particular application profile, or modify the flow of the application for the one or more components in a deployment associated with an application profile.

In some embodiments, the deployment engine 108 and application clients 114 operate together to provide the deployment functionality. That is, in some embodiments, the operations provided by the deployment engine 108 described above for determining and allocating application profiles would typically require the application client (perhaps in conjunction with the application server 104) to provide customized deployments to the user.

It will be appreciated that although only two user devices (118A and 118B) have been depicted, in normal operation, many more user devices 118 may be connected to the application system 102 through the network 116. Also, it will be appreciated that although the deployment engine 108 in FIG. 1A is depicted as part of the application system 102, in some embodiments it may be hosted in whole or in part on a different system.

Further, it will be appreciated that although only one application system 102 is depicted in FIG. 1, the processing system 100 can have more application systems 102. For example, a company that offers different software applications may have multiple such software application systems 102 connected to the user devices 118. When multiple application systems 102 are present, the deployment engine 108 may be a separate/standalone entity that receives application usage data from the monitoring system 106 of each of the application systems 102 and customizes deployments for each of the application systems 102.

Computer System

Figure 2:
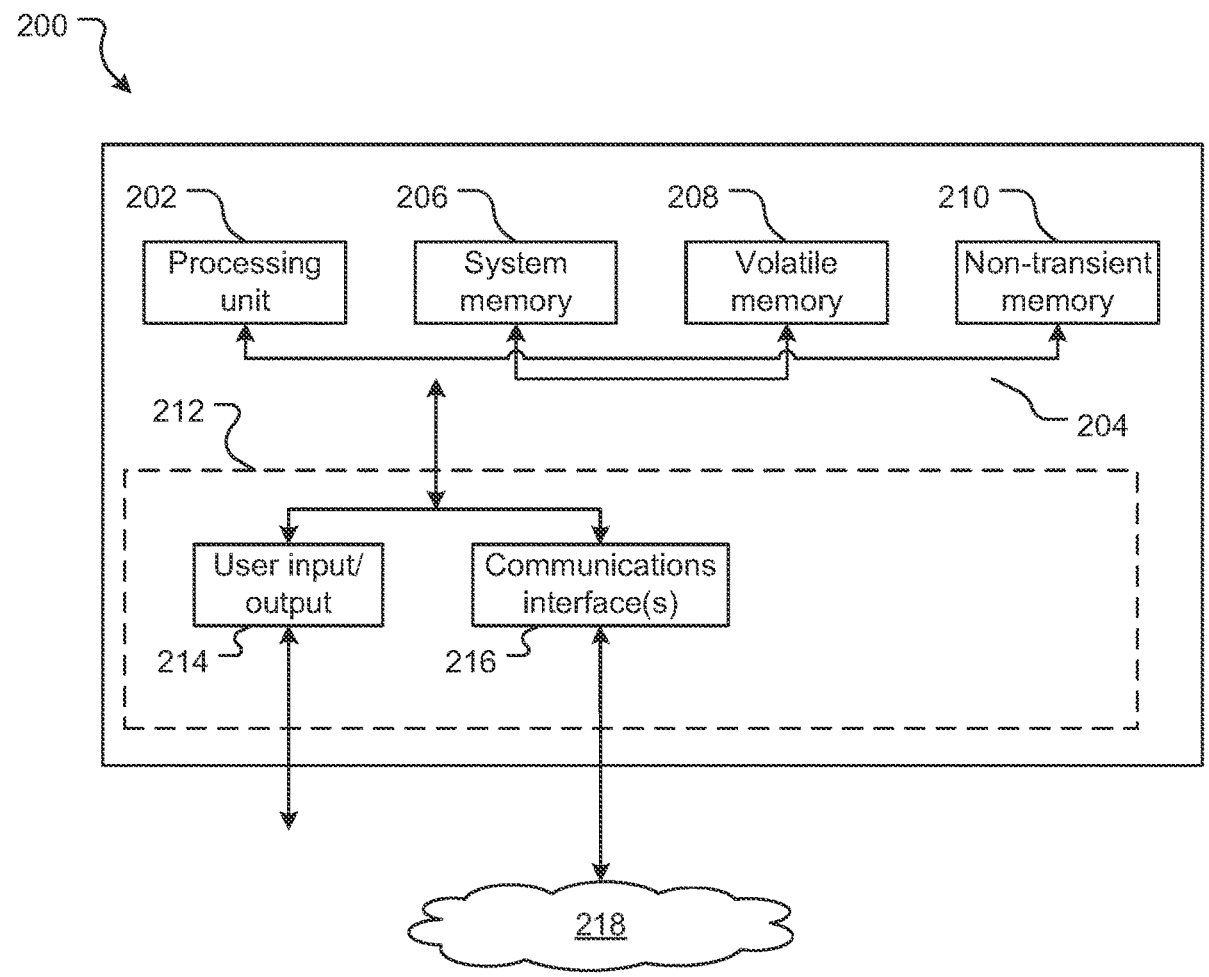
FIG. 2 provides a block diagram of a general-purpose computer processing system configurable to perform various features of the present disclosure.

The present invention is necessarily implemented using electronic devices. Each electronic device is, or will include, a computer processing system. FIG. 2 provides a block diagram of one example of a computer processing system 200 which may be for example application system 102, or the user devices 118A, 118B.

System 200 as illustrated in FIG. 2 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

The computer processing system 200 includes at least one processing unit 202. The processing unit 202 may be a single computer-processing device (e.g. a central processing unit, graphics processing unit, or other computational device), or may include a plurality of computer processing devices. In some instances all processing will be performed by processing unit 202, however in other instances processing may also, or alternatively, be performed by remote processing devices accessible and useable (either in a shared or dedicated manner) by the system 200.

Through a communications bus 204 the processing unit 202 is in data communication with a one or more machine-readable storage (memory) devices that store instructions and/or data for controlling operation of the processing system 100. In this instance system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 112, via which the processing system 100 interfaces with various devices and/or networks. Generally speaking, other devices may be physically integrated with system 200, or may be physically separate. Where a device is physically separate from system 200, connection between the device and processing system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 100 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 200 connects—whether by wired or wireless means—allow data to be input into/received by system 200 for processing by the processing unit 202, and data to be output by system 100. Example devices are described below, however it will be appreciated that not all computer-processing systems will include all mentioned devices, and that additional and alternative devices to those mentioned may well be used.

For example, system 200 may include or connect to one or more input devices by which information/data is input into (received by) system 200. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 200 may also include or connect to one or more output devices controlled by system 100 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 200 may also include or connect to devices which may act as both input and output devices, for example memory devices (hard drives, solid state drives, disk drives, compact flash cards, SD cards and the like) which system 100 can read data from and/or write data to, and touch-screen displays which can both display (output) data and receive touch signals (input).

System 200 may also connect to communications networks (e.g. the Internet, a local area network, a wide area network, a personal hotspot etc.) to communicate data to and receive data from networked devices, which may themselves be other computer processing systems.

It will be appreciated that system 200 may be any suitable computer processing system such as, by way of non-limiting example, a desktop computer, a laptop computer, a netbook computer, tablet computer, a smart phone, a Personal Digital Assistant (PDA), a cellular telephone, a web appliance. Typically, system 200 will include at least user input and output devices 214 and (if the system is to be networked) a communications interface 216 for communication with a network 218. The number and specific types of devices which system 200 includes or connects to will depend on the particular type of system 200. For example, if system 200 is a desktop computer it will typically connect to physically separate devices such as (at least) a keyboard, a pointing device (e.g. mouse), a display device (e.g. a LCD display). Alternatively, if system 200 is a laptop computer it will typically include (in a physically integrated manner) a keyboard, pointing device, a display device, and an audio output device. Further alternatively, if system 200 is a tablet device or smartphone, it will typically include (in a physically integrated manner) a touchscreen display (providing both input means and display output means), an audio output device, and one or more physical buttons.

System 200 stores or has access to instructions and data which, when processed by the processing unit 202, configure system 200 to receive, process, and output data. Such instructions and data will typically include an operating system such as Microsoft Windows®, Apple OSX, Apple IOS, Android, Unix, or Linux.

System 200 also stores or has access to instructions and data (i.e. software) which, when processed by the processing unit 202, configure system 200 to perform various computer-implemented processes/methods in accordance with embodiments of the invention (as described below). It will be appreciated that in some cases part or all of a given computer-implemented method will be performed by system 200 itself, while in other cases processing may be performed by other devices in data communication with system 200.

Instructions and data are stored on a non-transient machine-readable medium accessible to system 200. For example, instructions and data may be stored on non-transient memory 210. Instructions may be transmitted to/received by system 200 via a data signal in a transmission channel enabled (for example) by a wired or wireless network connection.

Example Process

Figure 3:
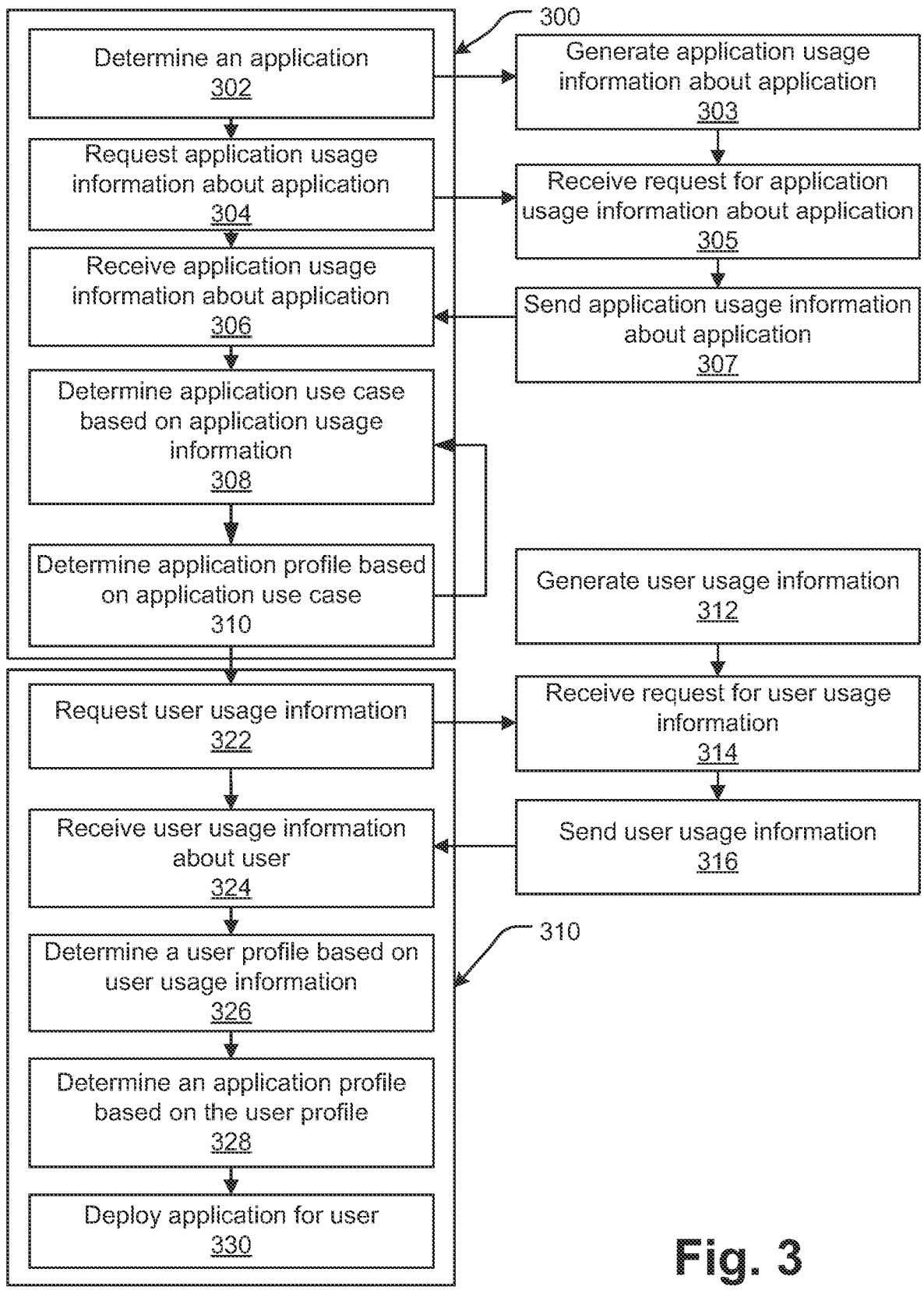
FIG. 3 is a flowchart of a method for profile based deployments.

FIG. 3 illustrates an example process for deployment of a software application. A first process 300 is performed to determine one or more application deployments based on usage information of the software application. This application usage information can then be used to determine one or more deployments of the software application, enabling customised software application deployments.

A second process 310 is performed to determine a user profile for a user based on the user usage information, and to select a customised deployment of the software application accordingly. The process may be performed, for example, by the system 100 and the disclosure of the process herein assumes this implementation. However, the process may be performed using other suitable computational apparatus.

The first process 300 may be performed at the same or at a different processing system 100 as the second process. When performed at a different processing system, the application deployments that have been determined at one system are communicated to the other system, which matches the deployments to users based on user usage information.

Process 300 commences at step 302, where an application is determined. In some embodiments, there may only be one application. In other cases, multiple applications are deployed or are available to be deployed. For example, the deployment engine 108 may receive an input indicating the application(s) for which usage information based deployments are to be determined. In another example, the deployment engine 108 may automatically determine each application that is made available for deployment in the system 100, for example each application hosted by the application system 102.

At step 303, the monitoring system 106 generates application usage information. The monitoring system 106 may also generate usage information for the usage of the application generally by multiple users, this can be, for example, based on the tracked event logs. Application usage information includes events or sequences of events. Usage information may also include specific hardware usage such as CPU or memory usage. Usage information may also include code, module, block, or component usage.

In some embodiments the usage information is or can be generated when users interact with the software application via the application client 114. This usage information is tracked by the monitoring system 106 and may be stored in the database 120. Typically this can be done via event logs wherein a record of each individual event is stored or logs of each computing resource is stored which can be matched to event logs corresponding to user usage. Logs may be maintained on by the application server 104 and stored in the database 120. Alternatively, each client 114 may maintain its own logs and then subsequently communicate the logs to the application server 104 at a later point (e.g., based on a predetermined schedule).

Events may be selectively used to produce usage information. For example, an event or hardware interrupt may be considered to be non-relevant and therefore may be ignored and not be stored in the database 120. In other cases, an event or hardware interrupt may be initially stored in the database 120 (e.g., because it was considered relevant at first) but then subsequently discarded as irrelevant (e.g., if the criteria for determining relevancy has changed).

Process 300 continues at step 304 where the deployment engine 108 requests application usage information about the application determined at step 302 from the monitoring system 106. In this example, the monitoring system 106 monitors the usage of the software application hosted by the application system 102 and the monitoring system 106 is a component running on the application system 102. In this example, the monitoring system 106 is actively monitoring usage information.

In some embodiments, the monitoring system 106 is external to the application system 102. Therefore, the deployment engine 108 may request and receive usage information about an application or user from an external source. In some cases, the application system 102 may supplement usage information about an application with externally provided usage information.

Once usage information has been received, the next step is to determine 308 one or more use cases. Use cases represent a specific set or sequence of interactions that a user has with an application. For example, a use case may be to open a dashboard in an application. The use case may include more than one action. Another use case is that the user is within a certain range of a number of accounts for the user, each account representing a user device 118 that may interact with the application, potentially at the same time.

At step 310 the profile module creates an application profile. An application profile defines different ways of using the same application. The application profiles can be associated with user profiles and are used to determine (as described below) one or more application deployments. In this example, once an application profile is determined more use cases and associated user profiles can be determined and more application profiles formed.

Although the steps 308 and 310 are illustrated in a specific order, it is to be understood that the multiple use cases may be determined at once, and then the corresponding application profiles may be determined that correspond to the use cases. There are many variations with these two steps that are to be understood to be within the scope of this disclosure.

At step 312 the monitoring system 106 monitors the usage of the software application hosted by the application system 102 in relation to a user and generates user usage information. Step 312 may involve monitoring the same or similar variables as in step as 303 and therefore invoke the same routines, however they are depicted independently for illustrative purposes. As with step 303, interactions may be monitored via the application client 114. The monitoring system 106 may also keep track of any associated application system events, such as a corresponding increase in CPU cycles or memory usage.

The deployment engine 108 then requests 322 the user usage information generated at step 312. The monitoring system 106 receives 314 the request for application usage information about the application. At step 316 the monitoring system 106 sends the user usage information. The deployment engine 108 receives 324 the user usage information sent at step 316.

At step 326, the profile module 110 determines a user profile based on the user usage information. A user profile is information about a user that indicates what use cases of an application the user utilises. This may involve statistical analysis of the usage information to determine which use cases are used frequently or infrequently. A user profile may take many forms: one example is a statistical summary of the events observed. The exact events depends on the profile and the dimensions used to measure the usage information.

The deployment engine 108 can then determine 328 an application profile of the software application. This may be based on matching one or more user profiles (or user usage information) to one or more application profiles and determining the best match. For example, each user profile may be associated with an application profile.

Once the application profile 328 has been determined, the deployment engine 108 can deploy 330 the application for the user. Deployment as a general term refers to the activities that make a software application available for use by a user. Given this, different versions of the application might be deployed into production (that is for public use) for different users.

Use Cases

Generally a use case is or reflects how a user (a user may comprise a group of users) interact with a software application. Use cases can be simple, for example relating to a single user input or event, or they can be complex relating to multiple user inputs and events. Some use cases may be manually defined. In some embodiments, determining a use case involve the use of heuristics, data mining and pattern recognition including artificial intelligence and machine learning. For example, statistical data analysis can be used to determine a use case for inbound webserver requests such as page loads and Representational state transfer (REST) requests, where a response with low-latency is required. In contrast, the same statistical data analysis can be used to determine a use case for executing background tasks (for example sending emails and webhooks, or performing synchronisation with external systems) that may have high throughput requirements but less strict latency requirements.

Use cases can be associated with particular components of a software application and/or with particular processing and memory resources that are made available to the software application. That is, most software applications are composed of multiple components, some of which may be independent. Use cases are a way to identify whether components of a software application are being used individually or in combination. If they are used in combination, the components will often be grouped together in the use case and any application profile. Software applications also call on hardware resources to operate, including for example processing resources, communication resources and memory resources. Different use cases can also be associated with different hardware resources.

Usage Information

Usage information is information about an application as used by one or more users and as measured by one or more metrics in one or more dimensions. For example usage information of a computer may include a count of the CPU cycles as reported by the operating system every 30 milliseconds. Other example usage information may be the amount of memory being used as reported by the operating system every 100 milliseconds. Another example of usage information is the time taken to process a request.

The usage information that is collected may change based on the execution environment of the software application as the usage would be different in different scenarios. For example, for cloud computation, usage might mean CPU intensity, GPU intensity, memory usage or input/output interface usage. In some virtualization scenarios, usage may be different again based on a virtualization or isolation level that is needed and acceptable for the application.

Usage information is therefore defined in different ways depending on the application and how the application is to be optimized. For example, one application may be optimized according to a metric of latency in network utilization. Another application may be optimized according to a metric of CPU usage, and so on.

This disclosure considers two types of usage information: application usage information and user usage information. Application usage information is used primarily for the purpose of determining an application profile and is based on data from multiple users. User usage information is used primarily for the purpose of determining a user profile based on data of a specific user.

Application Profile

An application profile is a specific category or pattern of usage based on the above usage information. The application profile may be based on one or more use cases identified above. Specifically, an application profile represents a range of interactions with the software application. Typically there are multitude of different ways to determine an application profile, and it may be optimal in some cases to have an application profile for each use case. However generally an application profile collectively represents a set of metrics or measurements of a collection of usage information that covers a range of use cases.

Associated with the application profile are application features or components that are used in the use cases or the application usage information. Specific components are not associated with a single application profile, but rather could be associated with many or even all the application profiles. In some embodiments, specific components may differ between some or all application profiles.

Although the application profiles are not necessarily mutually exclusive, it is preferable that they are not so similar that it makes it difficult for the deployment engine 108 to allocate a user profile to an application profile. Further, the application profile should typically cover as much as possible of the range of usage data.

In an example, events may be triggered by a user performing a specific user interaction with the application client 114. Events may be triggered a different number of times for different users. Some users may trigger events more than an average number of times and other events less than an average number of times. Identification of these patterns may help to identify the application profile.

In one example, it is possible to determine groups of usage data that are similar in one or more dimensions, where a dimension is a particular metric or measure by which the usage data can be analyzed, such as CPU usage, memory usage, network utilization, time to process a request or time to start processing a request (or other metric). This may be performed via cluster analysis where each cluster defines a group of use cases by identifying patterns in the usage information.

When users are allocated to an application profile based on the user profile (which as explained below are patterns in their user usage information), the deployment engine 108 can select or deselect components of the application such that the deployment engine 108 can customize the deployment of the software application for that user. For example, animation effects may be included in a deployment of a software application based on a determination that the user profile includes a relatively small time (e.g. a few milliseconds, such as 2 ms) to process a request, whereas animation effects may be excluded in a deployment based on a determination that the user profile includes a relatively large time (e.g. 100 milliseconds or more) to process a request. The boundary between deployments may be based on statistical analysis. In a simple example, a median response time for previous measures of the system (e.g. for determining user and/or application profiles or subsequently to recalculate profiles) may be selected as a boundary between application deployments. In another example, the network lag that a user experiences, either currently or during past interactions, is used for determining the user profile. A user located a large distance from a server for example may experience increased lag time. The application profile may then be adapted based on that user profile. Continuing with the example of animation effects, different animation effects may be provided for a "close" (in terms of lag time) user to those provided for a "distant" user. The user profile may be based on time of day, for example a user who accesses the system during peak periods that affect responsiveness may be allocated a user profile similar to a distant user, whereas a user who accesses the system during off-peak periods may be allocated a user similar to a close user.

Application profiles may be determined in different ways. One way may be to determine potential candidate profiles based on how the profiles may improve the performance or efficiency of the application. This may for example involve determining whether a candidate application profile will be an improvement over an existing deployment. In order to achieve this, one method is to obtain the average application deployment and measure the performance (over specified parameters in the usage information as per above) and then measure the performance of a random application deployment. By performing random optimization and comparing how different profiles affect performance compared to other profiles, the deployment engine 108 could then construct one or more optimizations for the given parameters and allocate application profiles accordingly. Therefore a set of application profiles can be determined that are, or are close to, a maximization of the optimizations that can be made for the application.

Another example is to use clustering techniques on the usage information to determine application profiles. Example techniques may utilize unsupervised learning to find the structure or relationships between different dimensions of usage information. Several approaches to clustering using unsupervised learning techniques can be used, such as subspace clustering, projected clustering, hybrid approaches, pattern based clustering and correlation clustering. This will create different clusters of application usage information and can enable the deployment engine 108 to put any newly acquired application usage data into an appropriate cluster. If some clusters are known beforehand and some of the usage information is classified accordingly, then a form of semi-supervised learning may be used. One specific example technique is non-negative matrix factorization.

User Profile

A user profile categorises one or more users by their usage information. That is, a user profile may be associated with a single user or multiple users where each of the multiple users have the same or similar usage information in at least one dimension or metric. The deployment 110 may allocate a user profile to be associated with one or more users individually or collectively. Users may be allocated to a user profile based on patterns in their usage information.

As an example, a user profile labelled 'beginner' may frequently utilise a help use case, that is, where a user opens the help menu. A user profile labelled expert does not utilise a help use case. Similarly, a user who uses the application client 114 to perform webserver requests and does not send emails or perform other background tasks may be allocated to a low-latency webserver use case as described above, instead of, for example, the high throughput webserver use case.

In some embodiments, the deployment module 110 determines usage information that are similar in one or more dimensions, where a dimension is a particular metric or measure by which the user usage information can be analyzed, such as frequency of an event. For example, if a specific use case will or is likely to trigger an open help event then the frequency of the help event being triggered may be relevant to the determination of the beginner or expert user profile. Other use cases may be associated with different user profiles.

The deployment module may use a number of different techniques, such as event-based or statistical analysis (based on a sample of usage information) or others including instrumented (that is adding code to track usage information), and simulation methods. In the examples given in this disclosure, the deployment module uses an event based technique for determining a user profile of a user. The deployment module may use a variety of techniques to collect data, including hardware interrupts, code instrumentation, instruction set simulation, operating system hooks, and performance counters. This may also include instrumenting either the program source code or its binary executable form using a tool called a profiler (or code profiler).

In one example embodiment, the deployment module may determine a range of potential user profiles based on application profiles. The deployment engine can then select the user profile in the range of potential user profiles that best matches a user.

| Application profile ID | Average CPU Usage | Average Memory Usage |
| --- | --- | --- |
| AP1 | 30% | 50% |
| AP2 | 15% | 20% |
| AP3 | 10% | 5% |

In this example, the potential user profiles are AP1, AP2, AP3. AP1 has an average CPU usage of 30% over the relevant period and has an average memory usage of 50% over the same period. AP2 has an average CPU usage of 15% over the relevant period and has an average memory usage of 20% over the same period. AP3 has an average CPU usage of 10% over the relevant period and has an average memory usage of 5% over the same period.

If a user were determined to have a user profile with an average CPU usage of 20% and an average memory usage of 20%, then the deployment engine would determine which of the potential user profiles best match this specific usage.

In this case, it is likely that AP2 would be the best match as it has similar CPU usage and memory usage characteristics.

Further considerations may affect the best user profile. For example, there may be some tasks or applications that will utilise a single CPU, and others that utilise multiple CPUs. If a user has a specific usage for a task or application that is not parallelizable (that is, the ability to spread the tasks or applications across multiple CPUs, such as a single threaded program to generate a document), then a user profile that utilises multiple CPUs may not be as efficient or useful as one that utilises a single CPU, although how well a multiple CPU application profile matches to the user profile will depend on the specific application or task. In other cases for example, there may be users with a specific usage for applications that use multiple CPUs but where each CPU does not require significant CPU power. Such users may be allocated user profiles that utilise multiple CPUs in a multi-tenant environment or allocated user profiles that can deploy across multiple low-tier target nodes (that is, nodes with lower hardware specifications).

Other considerations may include determining a compatibility between user profiles and a user's usage. For example, if a user's usage indicated use of a component of an application that is not available to a user profile (the component may have been removed for optimization) then the user's usage would be incompatible with that user profile. The user may be allocated to another user profile that is compatible with the user's usage.

Example Deployment

As above, the following is an example scenario where there are a set of application nodes. These application nodes perform inbound webserver requests (e.g. page loads, REST requests). Such requests would be optimal if responded to with low-latency.

The same application nodes also performs background tasks (e.g. sending emails and webhooks, or performing synchronisation with external systems). These background tasks have high throughput requirements, but less strict latency requirements.

Because the same application nodes were responsible for fulfilling both workloads, there is little optimization that can be performed. Therefore the deployments can be divided into two application profiles:

Webserver nodes that were optimised for low-latency response; and

Worker nodes that were optimised for high throughput.

Given these are both application profiles of the same application, both Webserver and Worker nodes would run the same code (but with different configuration parameters), and are deployed in parallel when changes are released.

By moving the background load from the application nodes to just the worker nodes and then optimising these nodes for throughput the overall number of nodes needed, for example, to serve peak load can be reduced.

The invention claimed is:

1. A computer implemented method for deploying an application, the method comprising:
   at an application system hosting one or more software applications, each software application having a plurality of application deployments, wherein:
      a first application deployment of an application is based on a first set of user interactions with the application and includes a first set of application features;
      a second application deployment of the application is different to the first application deployment due to being based on a second set of user interactions with the application;
      the second set of user interactions is different to the first set of user interactions; and
      the second application deployment includes a second set of application features different from the first set of application features;
   receiving usage information about a user, the usage information indicating a third set of user interactions with at least one of the one or more software applications;
   selecting the first application deployment based at least in part on a similarity between the first set of user interactions and the third set of user interactions; and
   deploying the application for the user based on the first application deployment.

2. The computer implemented method of claim 1, further comprising, at the application system:
   receiving usage information about another user ("second user"), the usage information about the second user indicating a fourth set of user interactions with at least one application of the one or more applications; and
   selecting the second application deployment for the second user based at least in part on a similarity between the second set of user interactions and the fourth set of user interactions; and
   deploying the application for the second user based on the second application deployment.

3. The computer implemented method of claim 1 further comprising generating a user profile of the user based at least in part on patterns in the third set of user interactions.

4. The computer implemented method of claim 3 wherein patterns in the third set of user interactions are determined by analysing the third set of user interactions in accordance with one or more metrics.

5. The computer implemented method of claim 1, wherein the first set of user interactions, the second set of user interactions, and the third set of user interactions are events generated by users interacting with a client application on a user device.

6. The computer implemented method of claim 1, wherein:
   the method further comprises generating a user profile of the user based at least in part on the third set of user interactions; and
   selecting the first application deployment based at least in part on a similarity between the first set of user interactions and the third set of user interactions includes a comparison between the user profile and the first set of user interactions.

7. The computer implemented method of claim 6, wherein the comparison comprises determining a range of candidate user profiles and determining which candidate user profile of the range of candidate user profiles best matches the user profile.

8. The computer implemented method of claim 7, wherein the range of candidate user profiles is determined as a table of lookup values.

9. The computer implemented method of claim 7, wherein the comparison is based on a metric of a computing resource.

10. The computer implemented method of claim 9 wherein the metric is one or more of:
    a frequency of an event;
    CPU usage;
    memory usage;
    network utilisation; or
    disk usage.

11. The computer implemented method of claim 1, further comprising, after deploying the first application deployment to the user:
  receiving subsequent usage information about the user indicating a fourth set of user interactions with at least one of the one or more software applications;
  selecting the second application deployment based at least in part on a similarity between the fourth set of user interactions and the second set of user interactions; and
  deploying the application for the user based on the second application deployment.

12. The computer implemented method of claim 1, wherein the third set of user interactions indicates one or more user interactions with stored documents.

13. A computer implemented method for deploying an application, the method comprising:
  determining, by a processing system, a first application profile based on first user interactions with a software application;
  determining, by the processing system, a second application profile that is different to the first application profile, the second application profile based on second user interactions with the software application;
  determining a first application deployment of the software application based on the first application profile, the first application deployment comprising a first set of application features;
  determining a second application deployment of the software application based on the second application profile, the second application deployment comprising a second set of application features different from the first set of application features;
  receiving, at the processing system, user usage information for a user, the user usage information for the user comprising information indicating third user interactions with the software application by the user;
  selecting, by the processing system and based at least in part on a similarity between the third user interactions and the first user interactions, the first application deployment and not the second application deployment; and
  based on the selection of the first application deployment, deploying by the processing system, the first application deployment of the software application for the user.

14. The computer implemented method of claim 13, wherein determining the first application profile comprises determining a use case based on a specified metric associated with a usage of the software application.

15. The computer implemented method of claim 14, wherein the specified metric measures a computing resource.

16. The computer implemented method claim 15, wherein the specified metric is one or more of:
  a frequency of an event;
  CPU usage;
  memory usage;
  network utilisation; or
  disk usage.

17. The computer implemented method of claim 15, wherein determining the first application profile comprises determining the use case via one or more of:
  heuristics;
  data mining;
  pattern recognition;
  artificial intelligence; and
  machine learning.

18. The computer implemented method of claim 13, further comprising:
  receiving additional user usage information for the user including fourth user interactions with the software application by the user;
  select, by the processing system and based at least in part on a similarity between the fourth user interactions and the second user interactions, the second application deployment for the user; and
  based on the selection of the second application deployment, deploying by the processing system, the second application deployment of the software application for the user.

19. A non-transitory computer-readable storage medium, storing instructions that when executed by a processor, cause the processor to:
  determine a first application profile based on first user interactions with a software application;
  determine a second application profile that is different to the first application profile, the second application profile based on second user interactions with the software application;
  determine a first application deployment of the software application based on the first application profile, the first application deployment comprising a first set of application features;
  determine a second application deployment of the software application based on the second application profile, the second application deployment comprising a second set of application features different from the first set of application features;
  receive user usage information for a user, the user usage information for the user comprising information indicative of third user interactions with LI sage of the software application by the user;
  select, from a group including the first application deployment and the second application deployment, the first application deployment for the user, the selection based at least in part on a similarity between the third user interactions and the first user interactions; and
  deploy the first application deployment for the user.

20. The non-transitory computer-readable storage medium of claim 18, wherein determining the first application profile for the user includes a comparison of the third user interactions and the first user interactions.

21. The non-transitory computer-readable storage medium of claim 19, further comprising instructions to cause the processor to:
  receive additional user usage information for the user;
  select the second application profile for the user based on the additional user usage information; and
  deploy the second application deployment for the user.

* * * * *